(12) United States Patent
Laporte (10) Patent No.: US 12,459,042 B2
(45) Date of Patent: Nov. 4, 2025

(54) HIGH-SPEED SPINDLE WITH FORCED MECHANICAL VIBRATORY ASSISTANCE

(71) Applicant: MITIS, Bouguenais (FR)

(72) Inventor: Sylvain Laporte, Orvault (FR)

(73) Assignee: MITIS, Bouguenais (FR)

( * ) Notice: Subject to any disclaimer, the term of this patent is extended or adjusted under 35 U.S.C. 154(b) by 528 days.

(21) Appl. No.: 17/916,281

(22) PCT Filed: Apr. 1, 2021

(86) PCT No.: PCT/EP2021/058763
§ 371 (c)(1),
(2) Date: Sep. 30, 2022

(87) PCT Pub. No.: WO2021/204709
PCT Pub. Date: Oct. 14, 2021

(65) Prior Publication Data
US 2023/0150038 A1    May 18, 2023

(30) Foreign Application Priority Data
Apr. 7, 2020    (FR) ...................................... 2003470

(51) Int. Cl.
*B23Q 5/04*      (2006.01)
*B23B 47/00*     (2006.01)
*B23B 47/34*     (2006.01)

(52) U.S. Cl.
CPC ................ *B23B 47/34* (2013.01); *B23Q 5/04* (2013.01); *B23B 47/00* (2013.01); *B23B 2220/36* (2013.01); *B23B 2260/008* (2013.01)

(58) Field of Classification Search
CPC ................ B23B 47/34; B23B 2220/36; B23B 2260/008; F16C 27/04; F16C 27/06;
(Continued)

(56) References Cited

U.S. PATENT DOCUMENTS 1,041,569 A * 10/1912 Bade .................... B25D 11/102
74/56
2,193,042 A * 3/1940 Roterberg ............... H04L 12/12
82/150
(Continued)

FOREIGN PATENT DOCUMENTS

DE    102005002460 A1    7/2006
DE    102005025364 A1 * 12/2006  ........... B23B 29/125
(Continued)

OTHER PUBLICATIONS

International Search Report (ISR) for PCT/EP2021/058763 mailed Jun. 9, 2021 (5 pages).
(Continued)

*Primary Examiner* — Nicole N Ramos
(74) *Attorney, Agent, or Firm* — Jason A. Smith; Shumaker, Loop & Kendrick, LLP (57) ABSTRACT

A spindle for a machine tool, including a housing, a shaft for driving a cutting tool, rotatably mounted inside the housing with a possibility of axial movement relative to the housing, a single ball, axially interposed between a bearing ring fixed relative to the housing and a bearing ring movable with the shaft, one of these rolling rings defining an inclined bearing surface that is not perpendicular to the axis of rotation of the shaft, so that the rotation of the ball generates an axial oscillation of the shaft.

17 Claims, 7 Drawing Sheets

(58) Field of Classification Search
CPC .... F16C 27/066; F16C 33/583; F16C 33/586; F16C 35/06; F16C 35/061; F16C 35/067; F16C 35/07; F16C 35/077; F16C 2226/62
See application file for complete search history.

(56) References Cited

U.S. PATENT DOCUMENTS

| | | | | |
|---|---|---|---|---|
| 2,520,473 | A * | 8/1950 | Shepard | B23B 23/04 82/150 |
| 2,762,666 | A * | 9/1956 | Potter | F16C 35/077 384/536 |
| 3,088,342 | A | 5/1963 | Whear | |
| 3,683,476 | A * | 8/1972 | Lea | F16C 33/14 29/434 |
| 3,738,719 | A * | 6/1973 | Langner | F16C 25/083 384/517 |
| 3,784,267 | A * | 1/1974 | Davis | F16C 27/045 384/453 |
| 4,744,678 | A * | 5/1988 | Fickelscher | F16C 19/24 384/572 |
| 5,342,152 | A * | 8/1994 | Medeksza | B23B 25/02 408/1 R |
| 5,624,193 | A * | 4/1997 | Vogelsberger | F16C 25/083 384/517 |
| 6,179,512 | B1 * | 1/2001 | Gibson | B23B 31/20125 403/374.1 |
| 8,303,188 | B2 * | 11/2012 | Otsuka | F16C 25/083 384/537 |
| 10,087,987 | B2 * | 10/2018 | Falomi | F16C 39/02 |
| 2006/0037444 | A1 * | 2/2006 | Robinson | B23B 23/04 82/170 |
| 2012/0308170 | A1 * | 12/2012 | Bitzl | F16C 19/54 384/456 |
| 2012/0314986 | A1 * | 12/2012 | Bitzl | F16C 35/042 384/584 |
| 2013/0301971 | A1 * | 11/2013 | Cudrnak | H02K 11/40 384/477 |
| 2017/0036275 | A1 * | 2/2017 | Haimer | B23B 31/028 |
| 2017/0274459 | A1 * | 9/2017 | Rebholz | B23B 51/104 |

FOREIGN PATENT DOCUMENTS

| | | |
|---|---|---|
| EP | 0237035 A2 | 9/1987 |
| EP | 2501518 B1 | 10/2013 |
| EP | 2790860 B1 | 3/2018 |
| KR | 20120117156 A * | 10/2012 |

OTHER PUBLICATIONS

Written Opinion (WO) for PCT/EP2021/058763 mailed Jun. 9, 2021 (13 pages).

* cited by examiner

HIGH-SPEED SPINDLE WITH FORCED MECHANICAL VIBRATORY ASSISTANCE

BACKGROUND

The applicant has developed numerous solutions for vibration drilling, in which a cutting tool is subjected to axial oscillations while it rotates.

These oscillations make it possible to break up chips and improve the drilling performance.

To bring about the axial movement of the tool, numerous existing solutions are based on the use of rolling bearings, one or more raceways of which have an undulating surface.

The patents EP2790860 B1 and EP 2501518 B1 describe examples of vibration machining devices.

The rolling bearings are typically made up of balls which are held in angular position with respect to one another by a rotary cage during rotation.

In the known solutions, the frequency of the axial oscillations depends on the rotational speed and on the number of undulations experienced by the rolling bearings while they rotate.

The rotational speed of the tool depends on its cutting speed and on its diameter. Thus, the more the diameter of the holes to be drilled decreases, the more the rotational speed needs to increase to maintain an equivalent cutting speed. However, the frequency of the axial oscillations cannot exceed a threshold, which is around 300 Hz, without generating excessive mechanical loads, on account in particular of the inertia of the moving pans. The rotational speed of the known vibration drilling spindles, based on a mechanical conversion of the rotational movement into an axial vibrating movement, is thus generally limited to 10 000 rpm.

In some applications, numerous small-diameter holes need to be produced very rapidly, for productivity reasons. It is thus common to drive small-diameter drill bits, in conventional non-vibration drilling, at rotational speeds much greater than 10 000 rpm, for example around 20 000 rpm, in order to adhere to their cutting speed. For some materials, the chips generated during cutting at these rotational speeds, in conventional drilling, have a short length and are evacuated easily.

However, other materials generate longer chips during conventional drilling, and these cannot be evacuated as easily without involving chip-clearing cycles. Thus, the choice of materials that are able to be machined in conventional drilling remains limited without losing productivity, this proving to be a drawback in certain applications.

Although there exist purely mechanical vibration drilling solutions in which the choice of the frequency of the oscillations is decoupled from the rotational speed of the shaft, these being based on the use of electromechanical or piezoelectric elements, these solutions are much more expensive and complex than the purely mechanical solutions, and their implementation, if mechanically possible, remains economically unviable in many applications, in particular when it is desired to minimize the changes made to the pool of existing machine tools during the implementation of the vibration drilling solution.

DE102005002460 presents a drilling tool comprising an oscillating unit incorporating a rolling bearing of the "thrust ball bearing" type having a single ball rolling between a first and a second ring. Such a rolling bearing is not designed to operate at high rotational speeds on account of the centrifugation of the ball. A calibration spring produces a forward movement which keeps the rolling bearing under compression.

U.S. Pat. No. 3,088,342 describes an oscillating drilling tool having a rolling bearing of the "thrust ball bearing" type. The oscillating movement is achieved with a split ring which, given its arrangement and the step imposed on the ball, brings about an oscillating movement which exhibits a significant discontinuity. Therefore, such a device cannot operate at high rotational speeds on account of the mechanical wear and the vibrations that are brought about.

There therefore remains a need that has not yet been met, as far as the applicant is aware, to benefit from a compact spindle that is capable of rotating at a high rotational speed while subjecting a cutting tool to axial oscillations with a frequency suitable for reducing the length of the chips that are formed.

SUMMARY OF THE INVENTION

The invention aims to meet this need, and achieves this aim by virtue of a spindle for a machine tool, having
 a housing,
 a shaft for driving a cutting tool, mounted rotatably inside the housing so as to be able to move axially relative to the housing,
 a single ball, interposed axially between a rolling bearing ring that is fixed relative to the housing and a rolling bearing ring that is movable with the shaft, one of these rings defining an inclined rolling bearing surface that is not perpendicular to the axis of rotation of the shaft, such that the rotation of the ball brings about an axial oscillation of the shaft.

The use in the invention of a single ball for bringing about the axial oscillating movement of the shaft makes it possible to keep the frequency of the axial oscillations at a value compatible with the inertia of the parts to be moved, including for rotational speeds greater than 10 000 rpm. Moreover, the absence of a cage that rotates with the ball reduces the heating of the rolling bearing at high rotational speeds. The invention makes it possible, if desired, to create a compact vibration drilling spindle that is capable of replacing a conventional spindle without otherwise modifying the machine tool.

Preferably, the ball is partially fitted in an annular groove formed in the shaft. This makes it possible to reduce the distance from the axis of its center of gravity and therefore the imbalance associated with its rotation, and the bending moment exerted by the ball on the shaft.

Preferably, the fixed rolling bearing ring is the one that defines the inclined rolling bearing surface. The inclined rolling bearing surface is advantageously planar, making it possible to create it very easily with high precision and a good surface state, this being advantageous for minimizing friction between the ball and the rolling bearing rings.

Such an inclined rolling bearing surface does not have a step. The lack of a step limits the generation of vibrations and mechanical wear.

Advantageously, the axial cutting loads are at least partially reacted at the rolling bearing ring that is fixed relative to the housing.

Preferably, the ball is made of ceramic, making it possible to optimize the strength, density ratio.

It is preferred for the ball to be situated at the rear of the spindle. This limits the effect of the bending moment on the quality of guidance of the shaft at the tool.

The spindle preferably has two sets of ball bearings, respectively at the front and at the rear of the spindle. These rolling bearings are preferably angular contact, and flanged rolling bearings. The ball is disposed preferably behind the rear set.

The rolling bearings are preferably kept centered so as to be able to move axially by elastic strips with oriented deformation and of annular overall shape. The latter preferably have, on their outer circumference, fixing tabs that are fixed relative to the housing and, between these fixing tabs, tabs for retaining the rolling bearings, the flexibility of the portions of the strips extending between the fixing tabs and the tabs for retaining the rolling bearings allowing the rolling bearing to move axially during the axial oscillations of the shaft. The use of the strips provides an elegant solution to the problem of ensuring radial stiffness while allowing the axial movement that is necessary for the shaft to be able to oscillate axially. The strips have a high stiffness in the radial direction, but their small thickness allows them to bend in order to follow the axial movement of the rolling bearings. The strips may be superposed to increase radial stiffness, while maintaining axial flexibility.

The rolling bearings may be mounted on bearings that are rotationally indexed relative to the strips, preferably by pins passing through the strips, the bearings having sectors forming a protrusion on their end edge, against which the sectors the strips res, the strips being in contact with the outer rings of the rolling bearings via their retaining tabs. These sectors make it possible to immobilize the retaining tabs of the strips relative to the bearings while maintaining an axial clearance between the immobilized zones in order to allow the portions of the strips extending therebetween to bend in order to allow the axial movement of the rolling bearings relative to the housing during the axial oscillations of the shaft.

Flat springs may be present for pressing the strips against the outer rings of the rolling bearings. These flat springs may be left out, apart from that or those serving, where appropriate, as an elastic member for applying the axial preload on the shaft, as explained below.

The spindle has an elastic return member which returns the shaft toward the rear, during the rotation of the ball. This axial preloading of the shaft toward the rear is advantageously effected by at least one flat spring. The spindle may thus have at least one flat spring, or even a single flat spring, which exerts a return force toward the rear. This flat spring may be situated at the front or at the rear of the spindle. Placing it at the rear make it possible to avoid the introduction of a compressive force along a significant rotor length. The return force toward the rear of such an elastic member is advantageously at a maximum during non-zero cutting forces and relieved when the cutting forces are greater than 0.

The axial immobilization of the strips with respect to the housing may be effected in various ways, but very preferably, the strips are held at the fixing tabs with the aid of a series of spacers. Preferably, the spindle thus has a main tubular spacer, fixed relative to the housing, and fixed positioning rings disposed on either side of the main spacer, the strips having their fixing tabs gripped between the main spacer and the positioning rings.

The spindle preferably has bearing end rings on either side of the bearings, in which end rings the abovementioned pins are fitted, the flat spring or springs pressing against one end of these end rings, the other end bearing against a surface that is fixed relative to the housing.

The housing is preferably closed at the rear by an end piece against which the rolling bearing ring defining the inclined rolling bearing surface rests.

Preferably, the spindle has a peripheral rolling bearing ring, coaxial with the shaft, for reacting the centrifugal forces of the ball. Reacting centrifugal forces is particularly advantageous for drilling holes at rotational speeds greater than 10 000 rpm.

The ratio $d_{ball}/d_{path}$ is preferably between 0.4 and 0.6 where $d_{ball}$ denotes the diameter of the ball and $d_{path}$ that of the contact point of the ball with the inclined rolling bearing surface.

A further subject of the invention is a machining method, in particular a drilling method, in which the shaft of a spindle according to the invention is driven at a rotational speed of at least 10 000 rpm, for example between 15 000 and 30 000 rpm, in particular around 15 000 to 20 000 rpm.

A further subject of the invention is a machining method, in particular a drilling method, in which the shaft of a spindle according to the invention oscillates axially with a vibration frequency of between 0.4 and 0.6 axial oscillations per revolution, in particular around 0.5.

The spindle may undergo an advancing movement during the rotation of the shaft, in a conventional manner.

BRIEF DESCRIPTION OF THE DRAWINGS

The invention may be understood better from reading the following description of nonlimiting implementation examples thereof and from examining the appended drawing, in which.

DETAILED DESCRIPTION

The spindle 1 according to the invention, shown in particular in FIGS. 1 to 4, has a housing 10, preferably metallic, with the overall shape of a cylinder of revolution about a longitudinal axis X.

The casing 10 is mounted in a guiding and advancing mechanism (not shown), known per se, of the machine tool. A support 11 fixed to the housing allows said mechanism to move the spindle 1 axially by the distance necessary to produce the drilled hole.

The spindle 1 has a shaft 20 which is intended to carry at the front a tool such as a drill bit (not shown) and which is coupled at the rear to a pulley 21 for driving it in rotation. The drill bit has for example a diameter less than or equal to 2.5 mm.

The rotational speed of the shaft 20 is for example between 10 000 and 20 000 revolutions per minute.

The invention is not limited to a particular tool, or to the creation of the drilled hole. It may in particular prove useful to carry out machining operations such as milling operations, counterboring operations, etc.

Figure 1:
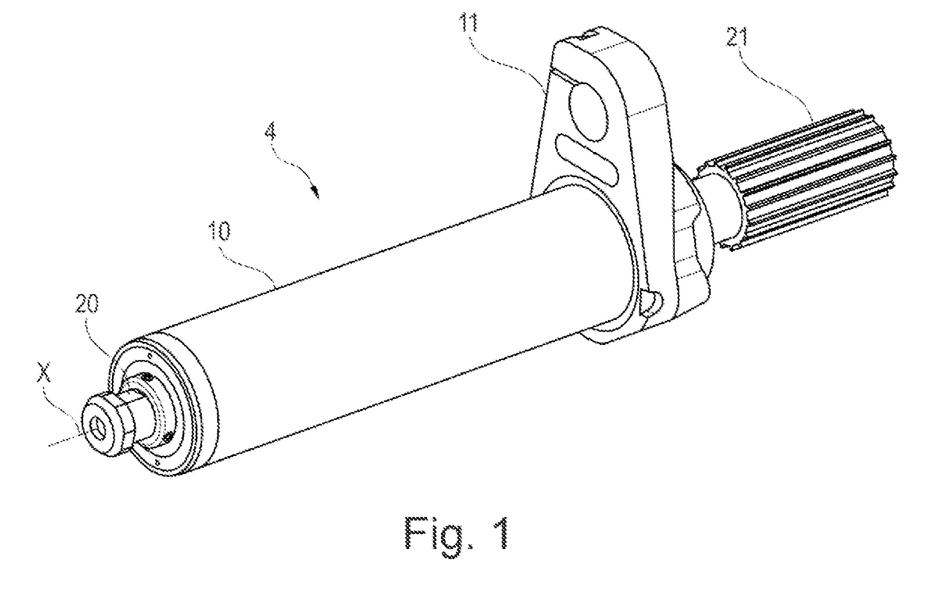
FIG. 1 schematically shows a perspective view of an example of a spindle according to the invention.
Figure 2:
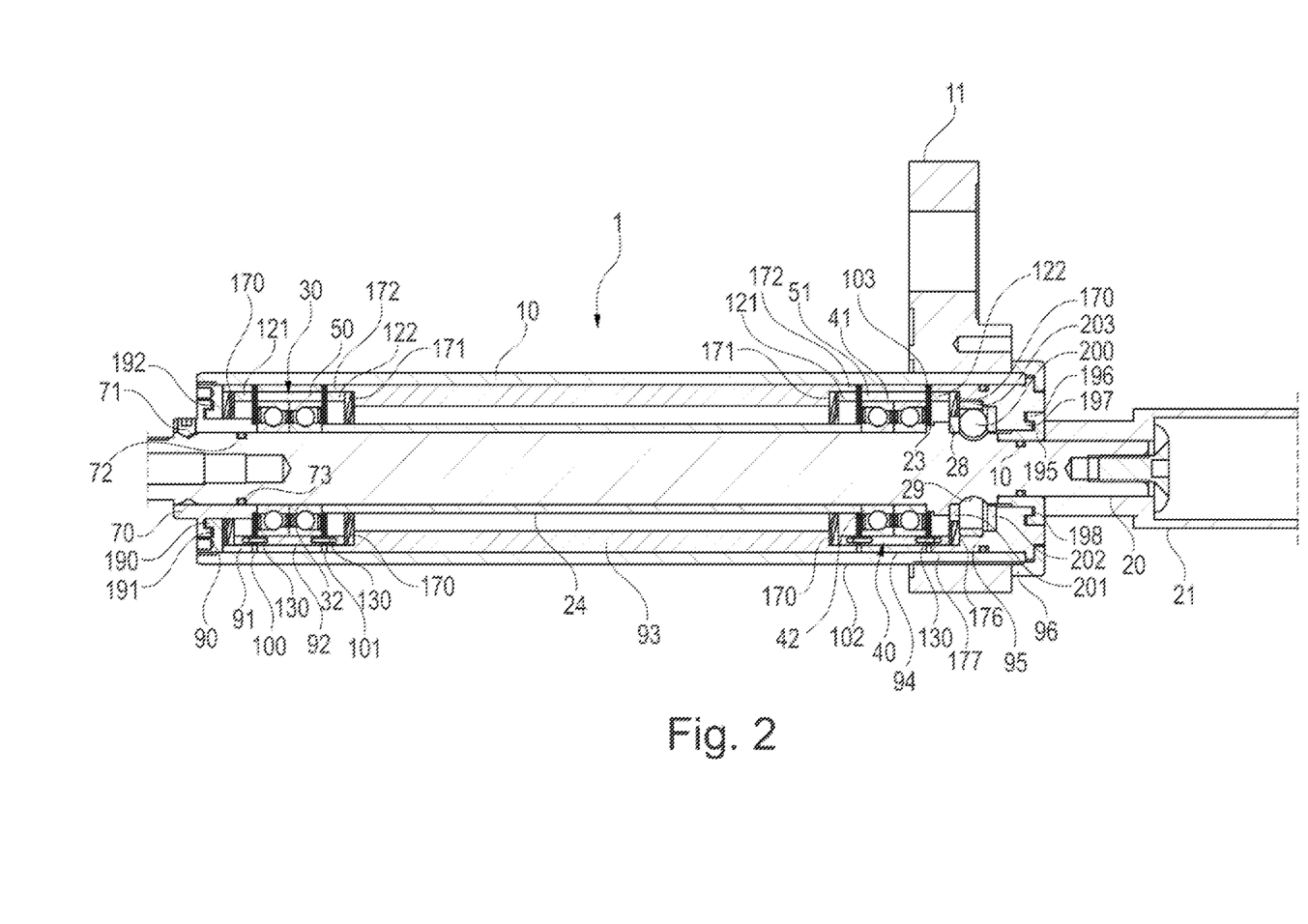
FIG. 2 is a longitudinal section through the spindle in FIG. 1.

The shaft 20 is guided in rotation about the axis X relative to the housing 10 by sets of front rolling bearings 30 and rear rolling bearings 40.

Figure 4:
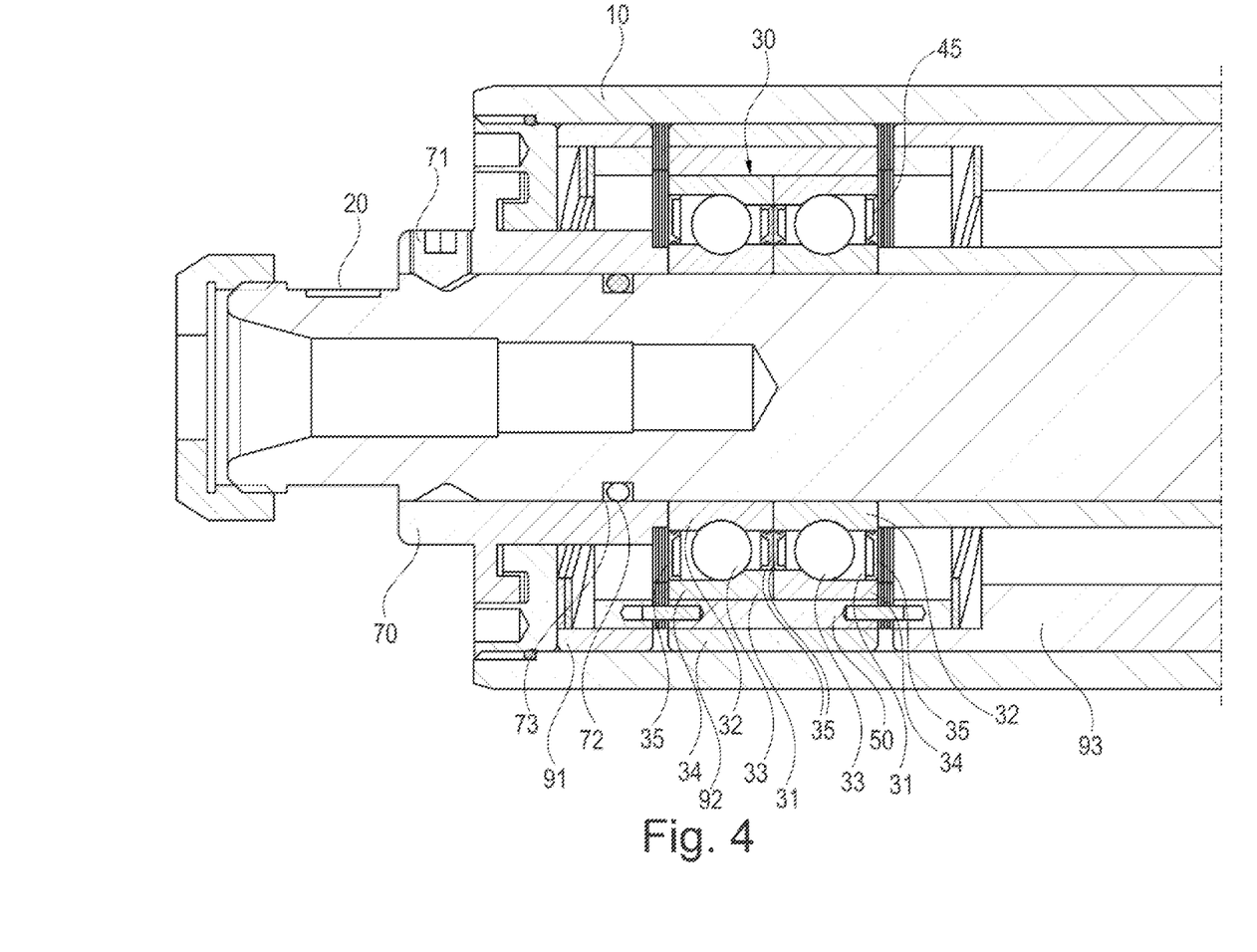
FIG. 4 shows the front of the spindle in more detail.

The set of front rolling bearings 30 has two angular contact ball bearings 31, the angle of contact of which is for example 15°, each having an inner ring 32, in contact with the shaft 20, balls 33, an outer ring 34 and flanges 35. The rolling bearings 31 bear against one another and are fitted in a front bearing 50.

Figure 3:
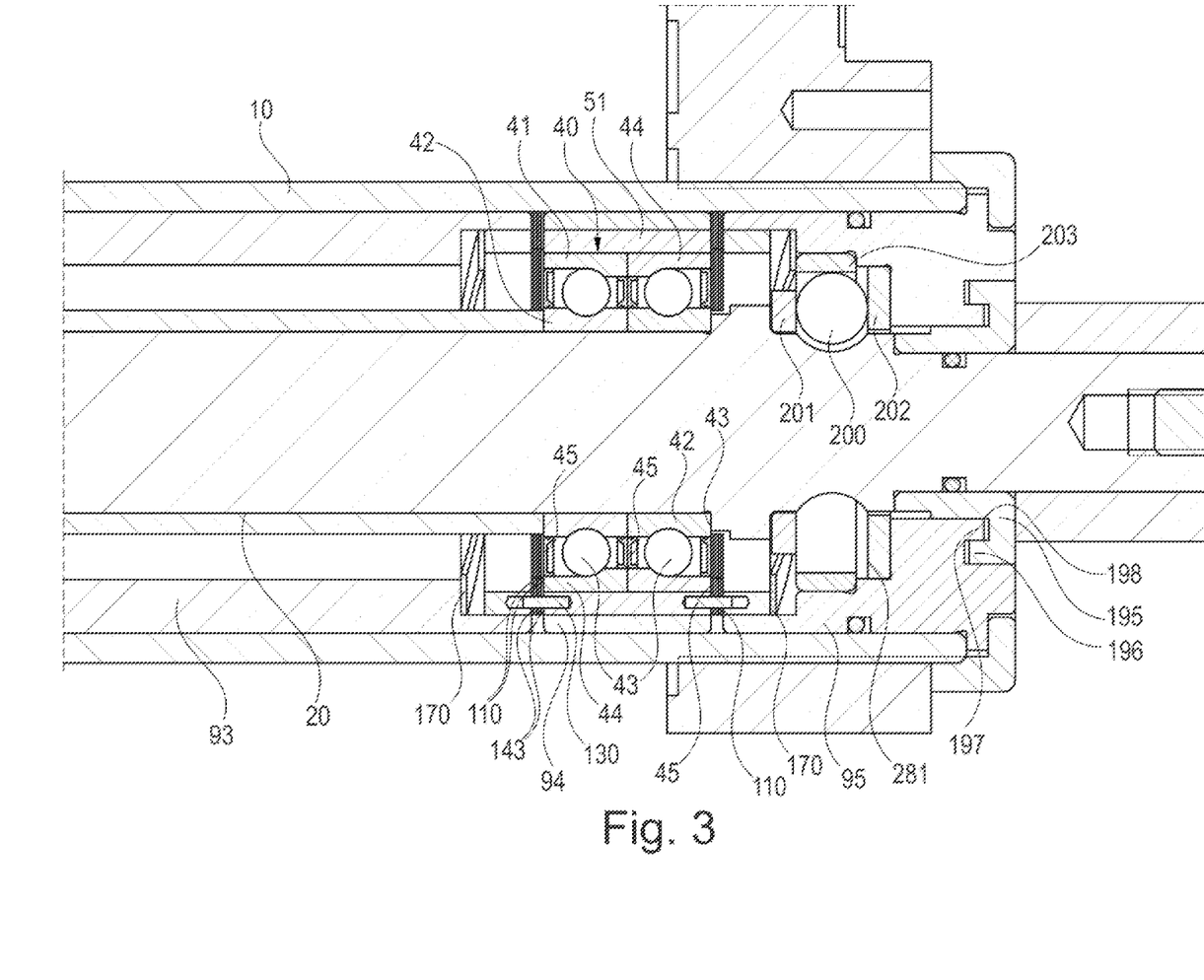
FIG. 3 shows the rear of the spindle in more detail.

The set of rear rolling bearings 40 is embodied in a similar way, with two angular contact rolling bearings 41, the angle of contact of which is for example 15°, each having an inner ring 42, in contact with the shaft 20, balls 43, an outer ring 44 and flanges 45. The rolling bearings 41 bear against one another and are fitted in a rear bearing 51.

The inner ring 42 of the rearmost rolling bearing comes to bear axially against a shoulder 23 of the shaft 20, as can be seen in particular in FIG. 3.

A tubular inner spacer 24 is mounted on the shaft 20 between the sets of front rolling bearings 30 and rear rolling bearings 40, and comes to bear at its ends against the inner rings 32 and 42 of the corresponding rolling bearings.

A blocking ring 70 is fixed to the shaft 20 at the front and immobilizes the inner rings 32 of the rolling bearings 31, the inner spacer 24 and the inner rings 42 of the rolling bearings 41 and causes them to axially preload the shaft.

The ring 70 is fixed to the shaft in the example illustrated with the aid of three cone-point set screws 71 which make it possible to correct an out-of-roundness, if necessary.

An O-ring seal 72 is accommodated in a groove 73 in the shaft 20 and presses against the blocking ring 70.

The housing 10 is closed at the front by a front nut 90, screwed therein, and at the rear by a rear closure part 95, which can be held in various ways on the housing 10, for example with the aid of a nut %, as illustrated in FIG. 2.

The front nut 90 has a forwardly directed collar 190, which forms a chicane 192 with a rearwardly directed collar 191 of the blocking ring 70.

An inner ring 195 is mounted on the shaft 20 at the rear, and has a forwardly directed collar 196, which forms a chicane 198 with a collar 197 of the closure part 95.

The chicanes 192 and 198 form a contactless sealing system at the front and the rear of the spindle 1 while providing a clearance allowing the rotation and translational movement without friction between the facing rotating and fixed parts.

An O-ring seal 199 is accommodated in a groove 27 in the shaft 20 and presses against the facing surface of the inner ring 195.

A series of spacers are disposed in the housing 10 in contact with its inner surface, being immobilized between the front nut 90 and the rear closure part 95, namely, from the front to the rear; a ring forming a front spacer 91, a ring forming a front bearing spacer 92, a main tubular spacer 93 and a ring forming a rear bearing spacer 94.

Four stacks 100, 101, 102 and 103 of elastic strips 110 are interposed axially between the spacers 91 and 92, between the spacers 92 and 93, between the spacers 93 and 94, and between the spacers 94 and 95, respectively.

Figure 5:
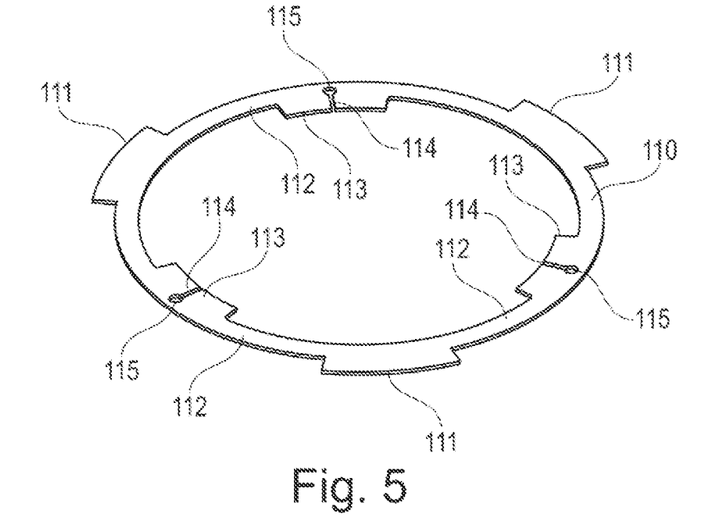
FIG. 5 shows a perspective view of an elastic strip on its own.

Each stack 100, 101, 102 or 103 has, in the example in question, at least two strips 110, for example five, one of which is shown on its own in FIG. 5.

Each strip 110 has an annular overall shape and has fixing tabs 111, distributed regularly at its periphery, of which there are three in the example in question, which are directed radially toward the outside and which bear with their radially outer edge against the inner surface of the housing 10.

The height of the fixing tabs 11*l* is slightly greater than the thickness of the bearing spacers 92 and 94.

The circular-arc portions 112 connecting the fixing tabs 111 carry, half-way along their length, other tabs 113, which are directed radially toward the inside. These tabs 113 each have a radial slot 114 which opens, at one end, onto the radially inner free edge of the tabs 113 and, at the opposite end, into a circular hole 115 formed in the circular-arc portion 112.

The front bearing 50 is disposed between two bearing end rings 121 and 122. Pins 130 are fitted in drilled holes 140 and 141 corresponding to these end rings 121 and 122 and the front bearing 50, in order to keep the rings 121 and 122 in a predetermined angular orientation with respect to the front bearing 50.

These pins 130 pass through the strips 110 by virtue of the holes 115. The slots 114 make it easier to fit the pins 130. Thus, the stacks 100 and 101 are kept angularly in a predefined position with respect to the bearing 50 and to the end rings 121 and 122.

Figure 6:
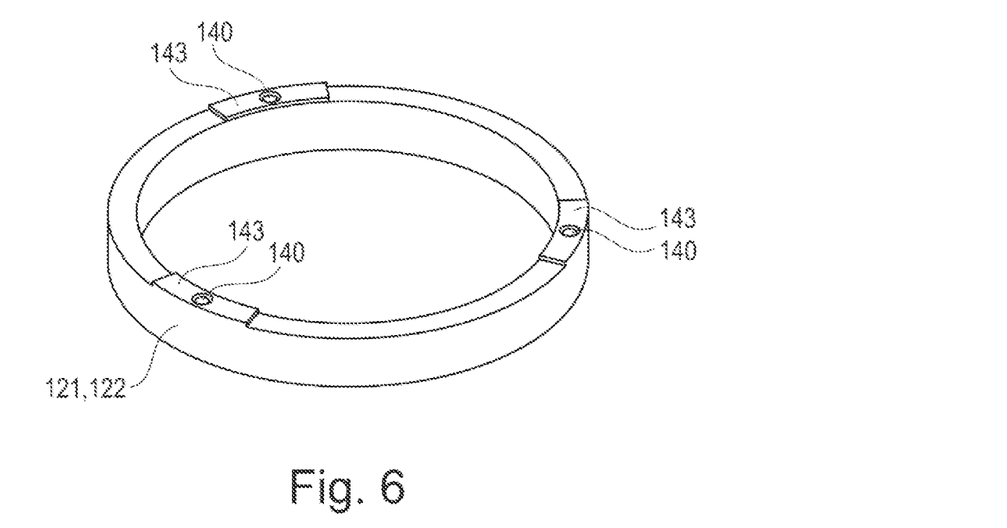
FIG. 6 shows a perspective view of a bearing end ring on its own.
Figure 7:
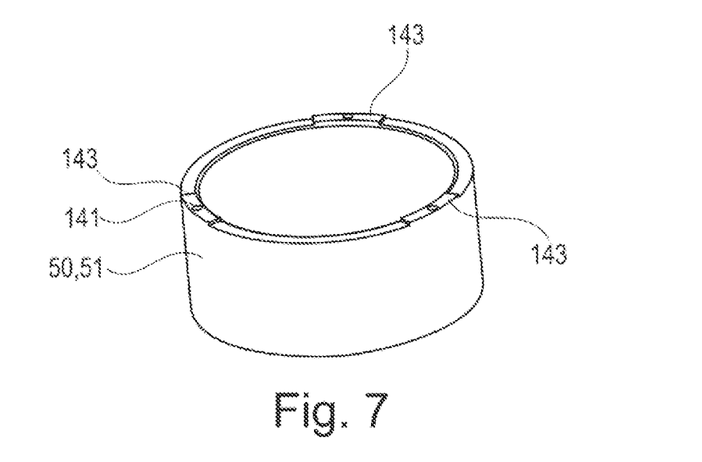
FIG. 7 shows a perspective view of a bearing on its own.

The bearing 50 and the rings 121 and 122 have, on their facing faces, protruding sectors 143, as can be seen in FIGS. 6 and 7, the angular extent of which corresponds substantially to that of the of the tabs 113, and which enclose the latter between one another.

The rear bearing 51 is similarly disposed between bearing end rings 120 and 121, and pins 130 angularly immobilize the strips 110 disposed therebetween, as in the case of the front bearing 50.

The tabs 113 of the strips 110 come axially into contact with the outer rings 32 and 42 of the rolling bearings 31 and 41.

This assembly allows a certain freedom of movement in the axial direction of the sets of rolling bearings 30 and 40, while keeping them centered as a result of the stiffness of the strips 110 in the radial direction, as will be described in detail below.

The main spacer 93 is formed with a shoulder 171 at each of its ends, set back from an end portion 172 surrounding the corresponding end ring 121 or 122.

A flat spring 170 is mounted inside each end portion 172 and is interposed axially against the shoulder 171 and this end ring 121 or 122.

At the front, two superposed flat springs 170 are mounted around the blocking ring 70 and are interposed axially between the front nut 90 and the end ring 121, as can be seen in FIG. 2.

The closure part 95 is formed with a shoulder 176 and an end portion 177 in front of the latter, which extends around the adjacent end ring 122.

A flat spring 170 is mounted inside the end portion 177 and is interposed axially between the closure part 95 and the adjacent end ring 122.

The flat springs 170 grip the elastic strips around the front and rear rolling bearings via the end rings 121 and 122, by way of the tabs 113 bearing on the outer rings of the rolling bearings.

The presence of an additional flat spring 170 at the front, between the nut 90 and the adjacent end ring 121, creates permanent elastic loading of the shaft 20 toward the rear in order to press the ball 200 onto the rings 201 and 202.

According to the invention, the spindle 1 has a mechanism for generating axial oscillations of the shaft 20 while it rotates.

This mechanism has a single ball 200 which rolls between a rotating rolling bearing ring 201, which is mounted on the shaft 20 and rotates therewith, and a fixed rolling bearing ring 202, which is carried by the closure part 95.

A peripheral rolling bearing ring 203 is inserted into the closure part 95, after the shoulder 176, and extends around the path followed by the ball 200 while it rotates. This peripheral ring 203 makes it possible to react the centrifugal forces during the rotation of the ball 200.

The rotating ring 201 is held against a shoulder 28 of the shaft 20, which borders an annular groove 29, the concavity of which substantially conforms to the path followed by the ball 200.

Figure 8:
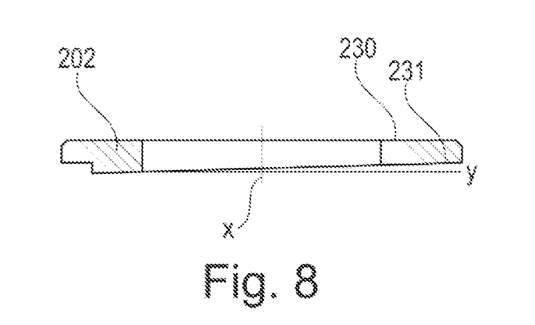
FIG. 8 shows the ring having an inclined rolling bearing surface in axial section.

The rolling bearing ring 202 has a rear face 230, which is planar and perpendicular to its axis, and a front face 231, which is planar and extends obliquely, as can be seen in FIG. 8, the normal to this face making an angle g with the axis of the rolling bearing ring 202, which is a few degrees, for example around 0.3° in the example in question. The formula for g is: $g=\text{Arctan}(\text{amplitude}/d_{path})$, with "amplitude" corresponding to the total peak/trough variation of the vibration oscillation, $d_{path}$ being the diameter of the path of the contact point.

As can be seen, the rolling bearing surface 231 does not have a step.

Thus, during its rotation about the axis X, the ball 200 carries out a periodic and sinusoidal axial movement which is caused by the inclination of the front face 231. The ball 200 is only in contact, during its high-speed rotation, with the fixed rolling bearing ring 202, the rotating rolling bearing ring 201 and the peripheral rolling bearing ring 203. On account of the use of a single ball, the rolling of the latter induces bending stresses on the shaft, but this remains controlled and with an acceptable amplitude on account of the relatively small distance between the ball 200 and the spindle axis 20.

The fact that there are no undulations on the rolling bearing surface 231 but rather a flat surface makes it possible to produce the latter very easily, with a very good surface state.

Preferably, the ball 200 is made of ceramic. Its diameter is preferably greater than or equal to 5 mm, making it possible to reduce the Hertz pressure at the contacts. Its diameter is for example 6 mm.

To mount the spindle 1, all the internal constituent elements can be disposed on the shaft 20, and the assembly can be inserted via the front end of the housing 10, the closure pan 95 already being in position, and then the front screw 90 can be fixed.

The spindle 1 operates as follows.

The shaft 20 is driven in rotation by the pulley 21, for example by a belt.

The ball 200 rolls between the rolling bearing rings 201 and 202 and in doing so moves the shaft 20 forward counter to the preload associated with the presence of an additional flat spring 170 at the front.

The movement of the shaft 20 is possible on account of the presence of the strips 110, the arced portions 112 of which can bend on account of the clearance provided next to them by the presence of the sectors 143. This bending allows the front bearing 50 and rear bearing 51 to move axially so as to follow the oscillations brought about by the movement of the ball 200.

Axial oscillations of the shaft 20 are thus obtained, the frequency of which is given both by the rotational speed of the shaft 20 and by the Willis formula applied to this rolling bearing with three contact points.

The axial travel of the shaft 20 during the oscillating movement is for example between 0.02 mm and 0.15 mm.

The shaft of the spindle oscillates with a vibration frequency of between 0.4 and 0.6 oscillations per revolution, for example around 0.5.

The presence of the groove 29 in the shaft 20, in which groove the ball 200 is partially inscribed, reduces the distance 200 from the axis X and therefore the phenomenon of imbalance linked to the use of a single ball 200. Moreover, the distance traveled by the ball 200 and the resultant wear are reduced. Lastly, the bending moment induced by the asymmetric loading with a single ball is reduced.

Of course, the invention is not limited to the example that has just been described.

Figure 9:
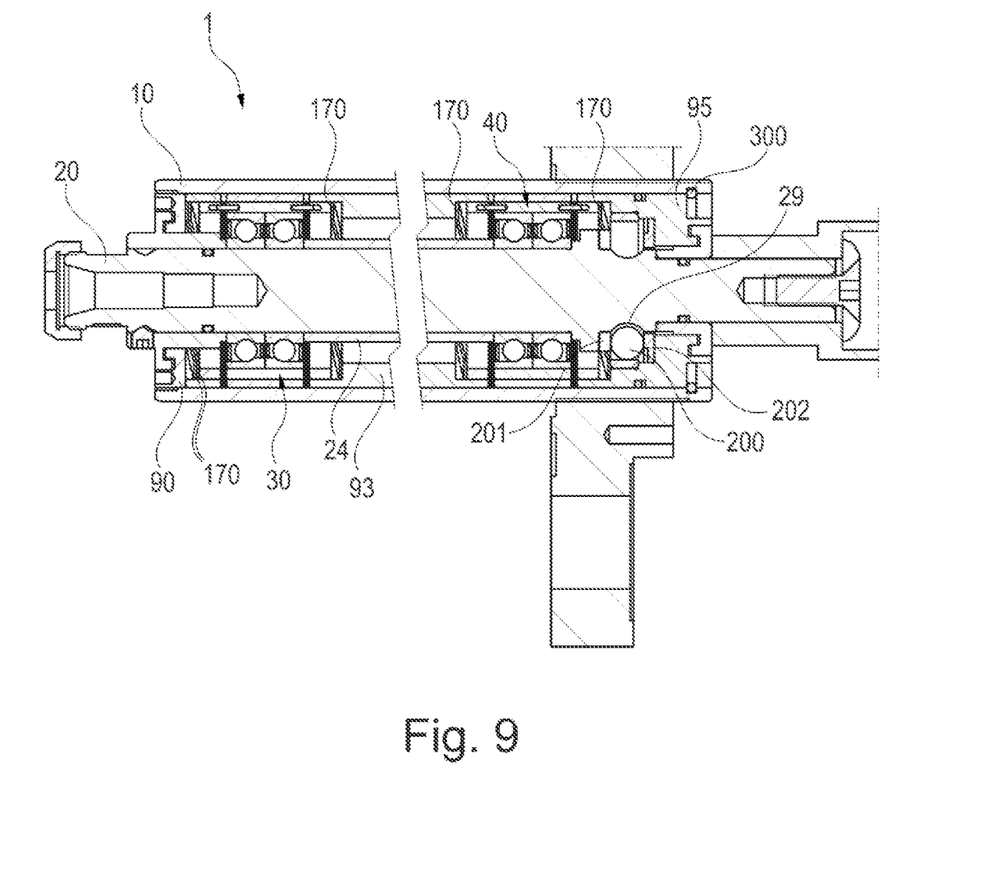
FIG. 9 shows an embodiment variant of the spindle in longitudinal section.

It is possible for example to close the housing 10 differently at the rear, as illustrated in FIG. 9. In this figure, it is apparent that the rear closure part 95 is retained in the housing by an elastic ring 300 mounted in a corresponding groove in the housing 10, thereby reducing the axial and radial space requirement of the housing.

It is possible to do away with the flat springs, apart from the one used to provide the axial preload on the shaft. The flat spring used to provide the axial preload on the shaft may be disposed at the rear, i.e. at the position in which, in FIG. 2, the flat spring 170 is located between the rear shoulder 171 and the ring 121 adjacent to the rolling bearing 41 radially on the inside of the bearing 51.

The invention claimed is:

1. A high-speed spindle for a machine tool, having
   a housing,
   a shaft for driving a cutting tool, mounted rotatably inside the housing so as to be able to move axially relative to the housing,
   a single ball, interposed axially between a rolling bearing outer ring that is fixed relative to the housing and a rolling bearing outer ring that is movable with the shaft, one of these rolling bearing outer rings defining an inclined rolling bearing surface that is not perpendicular to an axis of rotation of the shaft, such that the rotation of the ball brings about an axial oscillation of the shaft, the spindle being capable of operating at a rotational speed of the shaft greater than 10 000 rpm wherein the ball is partially fitted in a radially open annular groove formed in the shaft.

2. The spindle as claimed in claim 1, wherein the fixed rolling bearing outer ring is the one that defines the inclined rolling bearing surface.

3. The spindle as claimed in claim 1, wherein the inclined rolling bearing surface is planar.

4. The spindle as claimed in claim 1, wherein the ball is made of ceramic.

5. The spindle as claimed in claim 1, wherein the ball is situated at a rear part of the spindle opposite to a front part of the spindle, said front part of the spindle forming a working extremity of the spindle.

6. The spindle as claimed in claim 1, comprising two sets, each set comprising two ball bearings, one set of said sets being mounted on a front part of the spindle, said front part of the spindle forming a working extremity of the spindle, the other set of said sets being mounted at a rear part of the spindle, said rear part being opposite to the front part of the spindle.

7. The spindle as claimed in claim 1, comprising at least one flat spring ensuring an axial preloading of the shaft toward a rear part of the spindle, said rear part being opposite to a front part of the spindle, said front part of the spindle forming a working extremity of the spindle.

8. The spindle as claimed in claim 1, wherein the rolling bearing outer rings are held by strips of annular shape, said strips having, on an outer circumference, fixing tabs that are fixed relative to the housing and, between these fixing tabs, tabs for retaining the rolling bearing outer rings, each strip comprising a portions extending between the fixing tabs and the tabs for retaining the rolling bearing outer rings said portions of the strips being dimensioned to allowing the rolling bearing outer rings to move axially during the axial oscillations of the shaft.

9. The spindle as claimed in claim 8, wherein the rolling bearing outer rings are mounted on bearings supports that are prevented from rotating relative to the strips by pins passing through the strips, the bearings supports having bearing sectors forming a protrusion on their end edge, the bearing sectors resting against strip sectors of the strips in the region of the tabs in order to retain the rolling bearing outer rings, the strips being in contact with an outer rings of the rolling bearing outer rings via the retaining tabs.

10. The spindle as claimed in claim 9, comprising flat springs, said flat springs pressing the strips against the outer rings of the rolling bearing outer rings.

11. The spindle as claimed in claim 8, comprising a main tubular spacer, said tubular spacer being fixed relative to the housing, the spindle comprising fixed positioning rings one of said fixed positioning rings being disposed on a first side of the main tubular spacer, an other of said fixed positioning rings being disposed on a second side of the main tubular spacer, the second side of the main tubular spacer being opposite to the first side of the main tubular spacer, the fixing tabs of the strips being gripped between the main tubular spacer and the positioning rings.

12. The spindle as claimed in claim 10, comprising end rings, wherein for each bearing support of said bearings supports, one of said end rings being disposed on a first side of said bearing support, an other of said end rings being disposed on a second side of said bearing support the second side of the bearing support being opposite to the first side of the bearing supports, said pins being fitted on said end rings, the flat springs pressing against one end of said end rings, an other end of said end rings bearing against the tabs for retaining the strips.

13. The spindle as claimed in claim 8, wherein the rolling bearings and are angular contact rolling bearings.

14. The spindle as claimed in claim 1, comprising a peripheral rolling bearing ring coaxial with the shaft, said peripheral rolling bearing outer ring being configured to resist to centrifugal forces of the single ball.

15. The spindle as claimed in claim 1, wherein a ratio between a diameter of the ball and a diameter of a trajectory of the contact point of the ball along the inclined rolling bearing surface is between ¼ and ½.

16. A machining method, in which the shaft of a spindle as defined in claim 1, is driven at a rotational speed of at least 10 000 rpm.

17. A machining method in which an vibration frequency of the shaft of the spindle as claimed in claim 1 is between 0.4 and 0.6 axial oscillations per revolution.

* * * * *